United States Patent [19]
Martin et al.

[11] 3,992,693
[45] Nov. 16, 1976

[54] UNDERWATER TRANSDUCER AND PROJECTOR THEREFOR

[75] Inventors: Joseph E. Martin, Los Angeles; Gene Zilinskas, Van Nuys, both of Calif.

[73] Assignee: The Bendix Corporation, North Hollywood, Calif.

[22] Filed: Dec. 4, 1972

[21] Appl. No.: 312,085

[52] U.S. Cl. .................................. 340/10; 310/9.1; 340/9
[51] Int. Cl.[2] .................................. H04B 13/00
[58] Field of Search .................................. 340/8–14, 340/15, 17, 7; 310/8.2, 8.3, 8.7, 9.1

[56] References Cited

UNITED STATES PATENTS

| | | | |
|---|---|---|---|
| 2,434,648 | 1/1948 | Goodale, Jr. et al. | 340/10 |
| 3,139,603 | 6/1964 | Church et al. | 340/9 X |
| 3,142,035 | 7/1964 | Harris | 340/13 R |
| 3,230,505 | 1/1966 | Parker et al. | 340/10 |
| 3,243,767 | 3/1966 | Kendig et al. | 340/9 X |
| 3,243,768 | 3/1966 | Roshon, Jr. et al. | 340/10 |
| 3,375,488 | 3/1968 | Bridges et al. | 340/8 R |
| 3,546,497 | 12/1970 | Craster | 340/10 |
| 3,564,491 | 2/1971 | Granfoss et al. | 340/10 |

OTHER PUBLICATIONS

*Under Water Acoustics Handbook II,* Vernon M. Albers, University Press, 1965, p. 335.

*Primary Examiner*—Harold Tudor
*Attorney, Agent, or Firm*—Robert C. Smith; William F. Thornton

[57] ABSTRACT

An underwater transducer having both projector and hydrophone elements utilizes a new technique permitting the annular projector rings of a given piezoelectric material and resonant frequency to be tailored in diameter to accommodate various requirements, such as a need for more interior space. Where the projector rings can be expanded to the diameter of an accompanying hydrophone array, this makes possible a more compact and, in particular, a shorter structure than has been used for transducers of similar capability before. In the transducer the projector rings are positioned axially along a central support tube alternating with the hydrophones arranged in annular groups. Each projector ring is formed of a plurality of segments of alternately active material and inactive material having a sound velocity differing from (usually faster than) that of the active material. Thus the diameter of the annular elements for a given active material and a desired resonant frequency may be varied since the resonant frequency is related to the velocity of sound in the composite material used in the elements.

5 Claims, 3 Drawing Figures

UNDERWATER TRANSDUCER AND PROJECTOR THEREFOR

BACKGROUND OF THE INVENTION

It has long been a practice to form underwater transmitter or projector elements of active piezoelectric materials such as barium titanate in an annular or cylindrical configuration and polarized such that, when energized, they expand and contract radially with the applied signals. It has also been known to form the elements in segments which are cemented together and in which electrodes are formed in the joints. Such an annular element will resonate at that frequency at which the mean circumference is equal to one wave length in the ceramic material. Thus the mean diameter will vary directly as the velocity of sound for a constant resonant frequency. For an annular element of a given material, then, the desired resonant frequency controls the diameter of the projector.

Because of its desirable qualities, barium titanate is often preferred as a projector material. It has the highest velocity of sound of conventional piezoelectric ceramic materials, and for a 10 KHz element the maximum diameter possible for an annular projector as described above is approximately 5.8 inches. The individual annular elements are normally axially arranged in a stack, and the small central aperture severely limits the space available inside the elements for structure and electrical circuitry. Consequently the projector elements have usually been displaced axially from the receiving hydrophones which are normally fabricated in arrays of considerably greater diameter to improve directional sensitivity. This tends to cause the entire projecting and receiving transducer assembly to be longer than is desirable. For many applications, it would be desirable for both operational and structural reasons to be able to fabricate the projectors of substantially greater diameter than would normally result from the materials used and the frequencies desired.

SUMMARY

It has been found that a projector ring of substantially greater diameter than that normally resulting from use of a single piezoelectric material may be fabricated by constructing a composite ring having segments of active piezoelectric material alternating with inactive segments of a material whose velocity of sound is substantially higher than that of the active material. In one sample ring using barium titanate and alumina, the effective velocity of sound was found to be approximately one and one-half times the sound velocity of barium titanate alone. This permitted the diameter of the projector ring to be increased from about six inches to over nine inches. By varying the proportional lengths (circumferentially of the segments), the proportion of active to inactive material may be varied to effect the desired diameter at the desired resonant frequency.

Obviously, the above technique has limits in that the composite cannot have a sound velocity faster than that of the material having the fastest sound velocity. The inactive material normally has the fastest sound velocity, and there is a practical limit as to the minimum amount of active material which can be used. A severe reduction in the amount of active material would cause a substantial reduction in power-handling capacity, thus necessitating more projector elements or a reduction in diameter to permit the individual projectors to handle more power. Another variable is in the choice of materials. Thus, while an element using barium titanate as an active material and alumina as an inactive material may, if expanded to a desired diameter, have too little active material and hence too little power-handling capacity, a more expensive inactive material having faster sound transmission, such as beryllium oxide, may be preferable since it would permit a higher proportion of active material and greater power-handling capacity per projector ring.

Many types of materials may be used for the inactive segments. Should it be desired to make an annular or cylindrical element of smaller diameter, an inactive material of lower sound velocity than that of the active segments (such as aluminum or a ceramic having lower velocity) may be substituted for that of higher velocity.

Projector elements of the type described above have been incorporated into a new projector-receiver transducer which is unusually compact and which permits an unusually efficient hydrodynamic design. In this design the axially arranged projector rings of expanded diameter are supported by a plurality of neoprene spacers on a central tube which includes the necessary electronic equipment, such as a power transmitter and a receiver. The neoprene spacers, in addition to supporting the projector rings, also carry alternately arranged rows of hydrophone (receiving) elements, the resulting configuration permitting a far shorter and more compact structure than those presently in use for similar applications. To achieve desired beam patterns for transmitting, it is necessary for the overall projector assembly to have a given height. Similarly, to achieve a desired pattern for the overall receiving hydrophone structure, it is necessary for the hydrophone assembly to have a given height. If these projector and hydrophone elements were not alternated as shown, or combined in some similar manner to make use of the available height of the structure, each would be approximately the height of the entire transducer, and the overall height of the transducer would have to be increased to nearly double that shown herein.

DETAILED DESCRIPTION OF THE PREFERRED EMBODIMENTS

Figure 1:
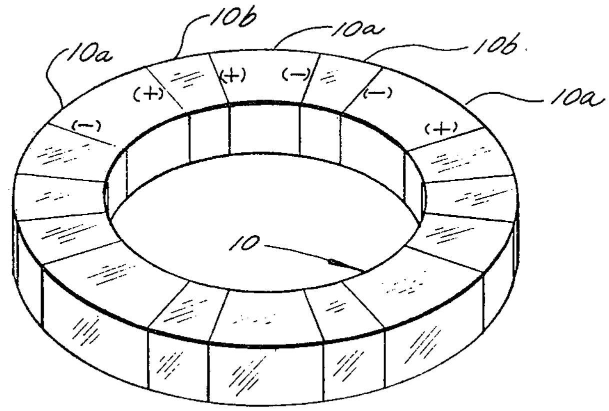
FIG. 1 is a perspective view of an annular projector ring made according to our invention.

FIG. 1 is a perspective view of an annular projector shown generally at numeral 10. This projector includes a plurality of alternately arranged segments 10*a* and 10*b* which are cemented together as by means of epoxy cement. Segments 10*a* are of an active piezoelectric material such as barium titanate, and these elements are formed with electrodes on the cemented edges which join the segments 10*b*. Segments 10*b* may be of an inactive ceramic material such as alumina or a normally active but unenergized ceramic piezoelectric material such as lead zirconate, or even of a metal such as aluminum. The electrical connections to the segments 10*a* are such that one edge of the segment is, on an instantaneous basis, positive while the opposite edge is negative. The nearest edge of the next segment 10*a* in each direction will have an energized edge which is of the same instantaneous polarity such that there is not a significant voltage drop across the inactive elements 10*b*. By proper selection of the dimensions of the segments 10*a* and 10*b* and the use of material having higher sound velocity in segments 10*b* than in segment 10*a*, a projector ring may be made of a desired resonant frequency, but of substantially greater diameter than would be the case if all segments were of the active material of segments 10*a*. If it were desired to reduce the diameter, one could use inactive segments of material having lower sound velocity than in the active segments 10*a*. The projector 10 is preferably wrapped with a layer of material such as glass epoxy (not shown) to provide additional tensile strength, which increases the power capability.

Figure 2:
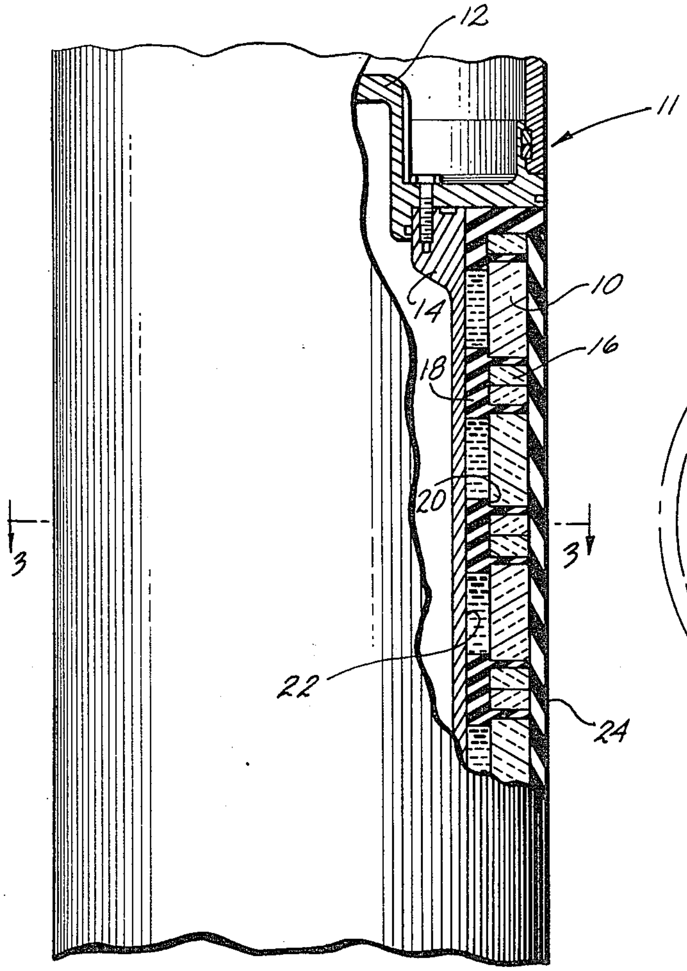
FIG. 2 is a view, partly in section and broken away top and bottom, of an underwater transducer made according to our invention.

FIG. 2 is a plan view, partially in section, of a transducer 11 incorporating the annular projection units 10 of FIG. 1. Other parts of the transducer are shown broken away, and these parts typically would include attaching means for a cable at the top and a weighted contoured nose structure at the bottom to insure a rapid sink rate, neither of which are parts of the present invention. A patent application, Ser. No 293,883 filed Oct. 2, 1972, of Calvin A. Gongwer, assigned to the same assignee as the present application, shows an underwater transducer configuration with which the structure described herein may be used.

Attached to a support member 12 is a generally cylindrical container 14 which is sealed to member 12 and which contains electronic equipment, the details of which are also not a part of the present invention. Such electronic equipment would normally include a transmitter connected to drive the projectors 10 and a receiver to which is connected a plurality of hydrophones 16. The power supply for the transmitter and receiver may also be in container 14, or all or part of it may be in a vehicle from which the transducer 11 is suspended into the water.

Hydrophones 16 are carried in a plurality of annular spacers 18 which surround the container 14 and which are preferably of a material such as neoprene. Spacers 18 include outwardly facing compartments into which pairs of the hydrophones are recessed and the walls of the compartments separate the adjacent groups of hydrophones as well as separating each layer of hydrophones from the projector above and below. Shoulders 20 on the spacers serve to support and position the projectors 10 which overlie a plurality of chambers 22 containing oil. The numbers of projectors and rows of hydrophones used are a matter of design, depending upon the amount of energy which it is desired to transmit, the sensitivity of the receiving system, the physical length which can be tolerated in the transducer, etc. An acoustically transparent sheath 24, which is preferably of neoprene, covers all of the outwardly facing surfaces of the projectors 10 and hydrophones 16. The alternate arrangement of projectors and hydrophones which makes possible shortening of the transducer is very practical, but other arrangements for interspersing the elements and hydrophones may be useful in a given application and still confer this advantage.

Figure 3:
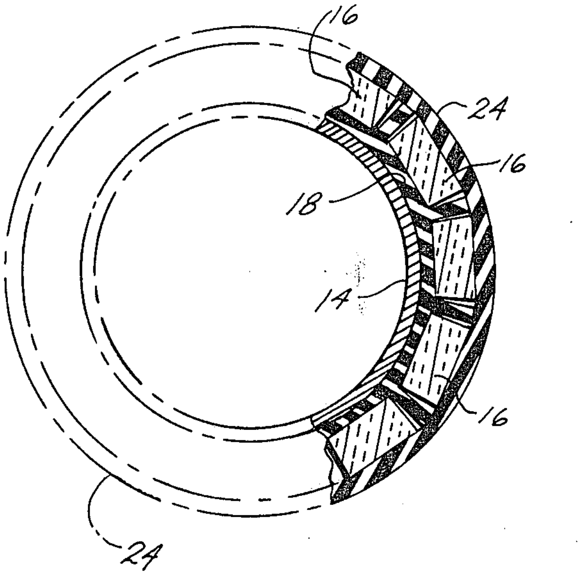
FIG. 3 is a section taken along line 3–3 of FIG. 2.

FIG. 3 is a sectional view of the transducer of FIG. 2 taken along line 3–3 of FIG. 2. In this view the wall of container 14 is shown surrounded by the spacer 18, and the hydrophones 16 are shown positioned in the recesses thereof and are outwardly directed. The hydrophones are arranged such that those in each spacer are aligned vertically with those in the spacers above and below and those in a given vertical alignment cooperate in providing input signals to the receiver representative of acoustic signals from a given sector. The receiver then processes these sector signals in such manner as to provide a desired display of acoustic signals covering the entire 360° around the transducer or a desired portion thereof. A suitable receiver for this purpose is described in U.S. Pat. No. 3,506,953 to E. W. Rudy, issued Apr. 14, 1970 (common assignee).

While the invention has been described in connection with specific transducer and projector configurations, those skilled in the art will recognize that modifications may be made within the spirit and scope of the present invention.

We claim:

1. An underwater transducer for projecting and receiving acoustic signals comprising:

a container of generally cylindrical configuration containing electronic equipment;

a plurality of annular spacers of flexible material around the outside of said container and axially spaced from each other, each of said spacers having a plurality of outwardly facing recesses positioned around its periphery;

a group of piezoelectric hydrophone elements positioned in said recesses;

a plurality of annular projector elements spaced from said container and supported on said spacers, said projector elements being axially spaced from each other alternately with said groups of hydrophone elements, each said projector element comprising a plurality of alternate segments of active piezoelectric material and other material having a sound velocity greater than that of said active piezoelectric material.

2. An underwater transducer as set forth in claim 1 wherein said segments are bonded together with electrodes on the bonded surfaces of said active segments.

3. A underwater transducer as set forth in claim 1 wherein said active material is barium titanate and said other material is alumina.

4. An underwater transducer as set forth in claim 1 wherein said electronic equipment includes a transmitter connected to said projectors and receiving means connected to said hydrophone elements.

5. An underwater transducer for projecting and receiving acoustic signals comprising:

a core section comprising a metal container of generally cylindrical configuration, said section containing electronic transmitting and receiving equipment;

a plurality of annular spacers of flexible material around the outside of said container and axially spaced from each other, each of said spacers including a plurality of recesses positioned around its periphery;

a group of piezoelectric hydrophone elements positioned in the recesses of each of said spacers;

a plurality of annular projector elements spaced from said container and supported on said spacers, said projector elements being axially spaced from each other alternately with said groups of hydrophone elements, each said projector element comprising a plurality of alternate segments of active piezoelectric material and inactive material having a sound velocity greater than that of the active material, said segments being bonded together and with electrodes on the bonded surfaces of said active segments.

* * * * *